United States Patent
Ampolini et al.

(10) Patent No.: US 9,936,733 B2
(45) Date of Patent: Apr. 10, 2018

(54) ACCESSORY CONFIGURED TO CHARGE AN AEROSOL DELIVERY DEVICE AND RELATED METHOD

(71) Applicant: RAI Strategic Holdings, Inc., Winston-Salem, NC (US)

(72) Inventors: Frederic Philippe Ampolini, Winston-Salem, NC (US); James William Rogers, Winston-Salem, NC (US); Bruce Alan Bengtsson, Winston-Salem, NC (US); James Demopoulos, Winston-Salem, NC (US); Michael Edward Laut, Raleigh, NC (US); Steven Wayne Bockmann, Raleigh, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 92 days.

(21) Appl. No.: 15/065,566

(22) Filed: Mar. 9, 2016

(65) Prior Publication Data

US 2017/0258133 A1  Sep. 14, 2017

(51) Int. Cl.
*A24F 47/00* (2006.01)
*H02J 7/00* (2006.01)
*A24F 15/18* (2006.01)

(52) U.S. Cl.
CPC ............ *A24F 47/008* (2013.01); *A24F 15/18* (2013.01); *H02J 7/0045* (2013.01); *H02J 7/0052* (2013.01)

(58) Field of Classification Search
CPC ........ A24F 47/008; A24F 15/12; A24F 15/18; A24F 15/14; H02J 7/0045; H02J 7/0052;
(Continued)

(56) References Cited

U.S. PATENT DOCUMENTS 1,771,366 A    7/1930  Wyss et al.
2,057,353 A   10/1936  Whittemore, Jr.
(Continued)

FOREIGN PATENT DOCUMENTS

AU       276250       7/1965
CA     2 641 869      5/2010
(Continued)

OTHER PUBLICATIONS

International Search Report, PCT/IB2017/051398, dated May 26, 2017.

*Primary Examiner* — Edwin A. Leon
(74) *Attorney, Agent, or Firm* — Womble Bond Dickinson (US) LLP

(57) ABSTRACT

An aerosol delivery device accessory is disclosed. The accessory may include a housing defining a cavity. An electrical power source and a connector may be engaged with a drawer assembly. The drawer assembly may be moveable with respect to the housing between extended and retracted configurations. In the extended configuration an aerosol delivery device may be engaged with the connector. In the retracted configuration the aerosol delivery device may be protected by the housing and recharged by the electrical power source. The drawer assembly may include a storage compartment configured to receive cartridges for the aerosol delivery device. Further, a slider may engage and move a cartridge between recessed and extended positions to store and provide access thereto. A related assembly method is also provided.

15 Claims, 11 Drawing Sheets

(58) Field of Classification Search
CPC ........ H02J 7/0044; H02J 7/0042; H02J 50/10;
H02J 7/025; H02J 7/0063; G01F 23/00;
B65D 25/005; B65D 3/04; G09F
2023/0025
USPC .......................................... 131/328, 347, 329
See application file for complete search history.

(56) References Cited

U.S. PATENT DOCUMENTS

| | | | |
|---|---|---|---|
| 2,104,266 A | 1/1938 | McCormick |
| 3,200,819 A | 8/1965 | Gilbert |
| 4,284,089 A | 8/1981 | Ray |
| 4,303,083 A | 12/1981 | Burruss, Jr. |
| 4,735,217 A | 4/1988 | Gerth et al. |
| 4,848,374 A | 7/1989 | Chard et al. |
| 4,907,606 A | 3/1990 | Lilja et al. |
| 4,922,901 A | 5/1990 | Brooks et al. |
| 4,945,931 A | 8/1990 | Gori |
| 4,947,874 A | 8/1990 | Brooks et al. |
| 4,947,875 A | 8/1990 | Brooks et al. |
| 4,986,286 A | 1/1991 | Roberts et al. |
| 5,019,122 A | 5/1991 | Clearman et al. |
| 5,042,510 A | 8/1991 | Curtiss et al. |
| 5,060,671 A | 10/1991 | Counts et al. |
| 5,093,894 A | 3/1992 | Deevi et al. |
| 5,144,962 A | 9/1992 | Counts et al. |
| 5,249,586 A | 10/1993 | Morgan et al. |
| 5,261,424 A | 11/1993 | Sprinkel, Jr. |
| 5,322,075 A | 6/1994 | Deevi et al. |
| 5,353,813 A | 10/1994 | Deevi |
| 5,369,723 A | 11/1994 | Counts et al. |
| 5,372,148 A | 12/1994 | McCafferty et al. |
| 5,388,574 A | 2/1995 | Ingebrethsen et al. |
| 5,408,574 A | 4/1995 | Deevi et al. |
| 5,468,936 A | 11/1995 | Deevi et al. |
| 5,498,850 A | 3/1996 | Das |
| 5,515,842 A | 5/1996 | Ramseyer et al. |
| 5,530,225 A | 6/1996 | Hajaligol |
| 5,564,442 A | 10/1996 | MacDonald et al. |
| 5,649,554 A | 7/1997 | Sprinkel et al. |
| 5,666,977 A | 9/1997 | Higgins et al. |
| 5,687,746 A | 11/1997 | Rose et al. |
| 5,726,421 A | 3/1998 | Fleischhauer et al. |
| 5,727,571 A | 3/1998 | Meiling et al. |
| 5,743,251 A | 4/1998 | Howell et al. |
| 5,799,663 A | 9/1998 | Gross et al. |
| 5,819,756 A | 10/1998 | Mielordt |
| 5,865,185 A | 2/1999 | Collins et al. |
| 5,865,186 A | 2/1999 | Volsey, II |
| 5,878,752 A | 3/1999 | Adams et al. |
| 5,894,841 A | 4/1999 | Voges |
| 5,934,289 A | 8/1999 | Watkins et al. |
| 5,954,979 A | 9/1999 | Counts et al. |
| 5,967,148 A | 10/1999 | Harris et al. |
| 6,040,560 A | 3/2000 | Fleischhauer et al. |
| 6,053,176 A | 4/2000 | Adams et al. |
| 6,089,857 A | 7/2000 | Matsuura et al. |
| 6,095,153 A | 8/2000 | Kessler et al. |
| 6,125,853 A | 10/2000 | Susa et al. |
| 6,155,268 A | 12/2000 | Takeuchi |
| 6,164,287 A | 12/2000 | White |
| 6,196,218 B1 | 3/2001 | Voges |
| 6,196,219 B1 | 3/2001 | Hess et al. |
| 6,598,607 B2 | 7/2003 | Adiga et al. |
| 6,601,776 B1 | 8/2003 | Oljaca et al. |
| 6,615,840 B1 | 9/2003 | Fournier et al. |
| 6,688,313 B2 | 2/2004 | Wrenn et al. |
| 6,772,756 B2 | 8/2004 | Shayan |
| 6,803,545 B2 | 10/2004 | Blake et al. |
| 6,854,461 B2 | 2/2005 | Nichols |
| 6,854,470 B1 | 2/2005 | Pu |
| 7,117,867 B2 | 10/2006 | Cox et al. |
| 7,293,565 B2 | 11/2007 | Griffin et al. |
| 7,513,253 B2 | 4/2009 | Kobayashi et al. |
| 7,775,459 B2 | 8/2010 | Martens, III et al. |
| 7,832,410 B2 | 11/2010 | Hon |
| 7,845,359 B2 | 12/2010 | Montaser |
| 7,896,006 B2 | 3/2011 | Hamano et al. |
| 8,127,772 B2 | 3/2012 | Montaser |
| 8,314,591 B2 | 11/2012 | Terry et al. |
| 8,365,742 B2 | 2/2013 | Hon |
| 8,402,976 B2 | 3/2013 | Fernando et al. |
| 8,499,766 B1 | 8/2013 | Newton |
| 8,528,569 B1 | 9/2013 | Newton |
| 8,550,069 B2 | 10/2013 | Alelov |
| D705,814 S | 5/2014 | Liberti et al. |
| 9,247,773 B2 * | 2/2016 | Memari .................. A24F 15/12 |
| 2002/0146242 A1 | 10/2002 | Vieira |
| 2003/0226837 A1 | 12/2003 | Blake et al. |
| 2004/0118401 A1 | 6/2004 | Smith et al. |
| 2004/0129280 A1 | 7/2004 | Woodson et al. |
| 2004/0200488 A1 | 10/2004 | Felter et al. |
| 2004/0226568 A1 | 11/2004 | Takeuchi et al. |
| 2005/0016550 A1 | 1/2005 | Katase |
| 2006/0016453 A1 | 1/2006 | Kim |
| 2006/0196518 A1 | 9/2006 | Hon |
| 2007/0074734 A1 | 4/2007 | Braunshteyn et al. |
| 2007/0102013 A1 | 5/2007 | Adams et al. |
| 2007/0215167 A1 | 9/2007 | Crooks et al. |
| 2008/0085103 A1 | 4/2008 | Beland et al. |
| 2008/0092912 A1 | 4/2008 | Robinson et al. |
| 2008/0257367 A1 | 10/2008 | Paterno et al. |
| 2008/0276947 A1 | 11/2008 | Martzel |
| 2008/0302374 A1 | 12/2008 | Wengert et al. |
| 2009/0095311 A1 | 4/2009 | Hon |
| 2009/0095312 A1 | 4/2009 | Herbrich et al. |
| 2009/0126745 A1 | 5/2009 | Hon |
| 2009/0188490 A1 | 7/2009 | Hon |
| 2009/0230117 A1 | 9/2009 | Fernando et al. |
| 2009/0272379 A1 | 11/2009 | Thorens et al. |
| 2009/0283103 A1 | 11/2009 | Nielsen et al. |
| 2009/0320863 A1 | 12/2009 | Fernando et al. |
| 2010/0043809 A1 | 2/2010 | Magnon |
| 2010/0083959 A1 | 4/2010 | Siller |
| 2010/0200006 A1 | 8/2010 | Robinson et al. |
| 2010/0229881 A1 | 9/2010 | Hearn |
| 2010/0242974 A1 | 9/2010 | Pan |
| 2010/0307518 A1 | 12/2010 | Wang |
| 2010/0313901 A1 | 12/2010 | Fernando et al. |
| 2011/0005535 A1 | 1/2011 | Xiu |
| 2011/0011396 A1 | 1/2011 | Fang |
| 2011/0036363 A1 | 2/2011 | Urtsev et al. |
| 2011/0036365 A1 | 2/2011 | Chong et al. |
| 2011/0094523 A1 | 4/2011 | Thorens et al. |
| 2011/0126848 A1 | 6/2011 | Zuber et al. |
| 2011/0155153 A1 | 6/2011 | Thorens et al. |
| 2011/0155718 A1 | 6/2011 | Greim et al. |
| 2011/0168194 A1 | 7/2011 | Hon |
| 2011/0265806 A1 | 11/2011 | Alarcon et al. |
| 2011/0309157 A1 | 12/2011 | Yang et al. |
| 2012/0042885 A1 | 2/2012 | Stone et al. |
| 2012/0060853 A1 | 3/2012 | Robinson et al. |
| 2012/0111347 A1 | 5/2012 | Hon |
| 2012/0132643 A1 | 5/2012 | Choi et al. |
| 2012/0227752 A1 | 9/2012 | Alelov |
| 2012/0227753 A1 | 9/2012 | Newton |
| 2012/0231464 A1 | 9/2012 | Yu et al. |
| 2012/0260927 A1 | 10/2012 | Liu |
| 2012/0279512 A1 | 11/2012 | Hon |
| 2012/0318882 A1 | 12/2012 | Abehasera |
| 2013/0037041 A1 | 2/2013 | Worm et al. |
| 2013/0056013 A1 | 3/2013 | Terry et al. |
| 2013/0081625 A1 | 4/2013 | Rustad et al. |
| 2013/0081642 A1 | 4/2013 | Safari |
| 2013/0192619 A1 | 8/2013 | Tucker et al. |
| 2013/0255702 A1 | 10/2013 | Griffith, Jr. et al. |
| 2013/0306084 A1 | 11/2013 | Flick |
| 2013/0319439 A1 | 12/2013 | Gorelick et al. |
| 2013/0340750 A1 | 12/2013 | Thorens et al. |
| 2013/0340775 A1 | 12/2013 | Juster et al. |
| 2014/0000638 A1 | 1/2014 | Sebastian et al. |
| 2014/0020697 A1 * | 1/2014 | Liu .......................... A24F 15/00 |
| | | 131/329 |
| 2014/0060554 A1 | 3/2014 | Collett et al. |

(56) References Cited

U.S. PATENT DOCUMENTS

| | | |
|---|---|---|
| 2014/0060555 A1 | 3/2014 | Chang et al. |
| 2014/0096781 A1 | 4/2014 | Sears et al. |
| 2014/0096782 A1 | 4/2014 | Ampolini et al. |
| 2014/0109921 A1 | 4/2014 | Chen |
| 2014/0157583 A1 | 6/2014 | Ward et al. |
| 2014/0209105 A1 | 7/2014 | Sears et al. |
| 2014/0253144 A1 | 9/2014 | Novak et al. |
| 2014/0261408 A1 | 9/2014 | DePiano et al. |
| 2014/0261486 A1 | 9/2014 | Potter et al. |
| 2014/0261487 A1 | 9/2014 | Chapman et al. |
| 2014/0261495 A1 | 9/2014 | Novak et al. |
| 2014/0270727 A1 | 9/2014 | Ampolini |
| 2014/0270729 A1 | 9/2014 | DePiano et al. |
| 2014/0270730 A1 | 9/2014 | DePiano et al. |
| 2014/0345631 A1 | 11/2014 | Bowen et al. |
| 2015/0053217 A1 | 2/2015 | Steingraber et al. |
| 2015/0097513 A1 | 4/2015 | Liberti et al. |
| 2015/0224268 A1 | 8/2015 | Henry |
| 2015/0245654 A1 | 9/2015 | Memari et al. |
| 2016/0037826 A1 | 2/2016 | Hearn et al. |
| 2016/0050975 A1 | 2/2016 | Worm et al. |
| 2017/0119044 A1* | 5/2017 | Oligschlaeger ......... A24F 15/00 |

FOREIGN PATENT DOCUMENTS

| | | |
|---|---|---|
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 201379072 | 1/2010 |
| DE | 10 2006 004 484 | 8/2007 |
| DE | 102006041042 | 3/2008 |
| DE | 20 2009 010 400 | 11/2009 |
| EP | 0 295 122 | 12/1988 |
| EP | 0 430 566 | 6/1991 |
| EP | 0 845 220 | 6/1998 |
| EP | 1 618 803 | 1/2006 |
| EP | 2 316 286 | 5/2011 |
| EP | 2454956 A1 | 5/2012 |
| GB | 2469850 | 11/2010 |
| WO | WO 1997/48293 | 12/1997 |
| WO | WO 2003/034847 | 5/2003 |
| WO | WO 2004/043175 | 5/2004 |
| WO | WO 2004/080216 | 9/2004 |
| WO | WO 2005/099494 | 10/2005 |
| WO | WO 2007/078273 | 7/2007 |
| WO | WO 2007/131449 | 11/2007 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/118644 | 10/2010 |
| WO | WO 2010/140937 | 12/2010 |
| WO | WO 2011/010334 | 1/2011 |
| WO | WO 2011095781 A1 | 8/2011 |
| WO | WO 2012/072762 | 6/2012 |
| WO | WO 2012/100523 | 8/2012 |
| WO | WO 2013/089551 | 6/2013 |
| WO | 2015150759 A1 | 10/2015 |
| WO | 2015150760 A1 | 10/2015 |
| WO | 2016016619 A1 | 2/2016 |
| WO | 2016016620 A1 | 2/2016 |

* cited by examiner

ACCESSORY CONFIGURED TO CHARGE AN AEROSOL DELIVERY DEVICE AND RELATED METHOD

FIELD OF THE DISCLOSURE

The present disclosure relates to aerosol delivery devices, and more particularly, to accessories configured to charge aerosol delivery devices. The aerosol delivery device may include an atomizer comprising a heating element configured to heat an aerosol precursor. The aerosol precursor composition, which may include components made or derived from tobacco or otherwise incorporate tobacco, is heated by the atomizer to produce an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar or pipe smoking, but without delivering considerable quantities of incomplete combustion and pyrolysis products that result from the burning of tobacco. To this end, there have been proposed numerous smoking products, flavor generators and medicinal inhalers that utilize electrical energy to vaporize or heat a volatile material, or attempt to provide the sensations of cigarette, cigar or pipe smoking without burning tobacco to a significant degree. See, for example, the various alternative smoking articles, aerosol delivery devices and heat generating sources set forth in the background art described in U.S. Pat. No. 7,726,320 to Robinson et al. and U.S. Pat. No. 8,881,737 to Collett et al., which are incorporated herein by reference. See also, for example, the various types of smoking articles, aerosol delivery devices and electrically-powered heat generating sources referenced by brand name and commercial source in U.S. Pat. Pub. No. 2015/0216232 to Bless et al., which is incorporated herein by reference. Additionally, various types of electrically powered aerosol and vapor delivery devices also have been proposed in U.S. Pat. App. Pub. Nos. 2014/0096781 to Sears et al., 2014/0283859 to Minskoff et al., 2015/0335070 to Sears et al., and 2015/0335071 to Brinkley et al., as well as U.S. patent application Ser. No. 14/327,776 to Ampolini et al., filed Jul. 10, 2014; and Ser. No. 14/465,167 to Worm et al., filed Aug. 21, 2014; all of which are incorporated herein by reference.

Certain existing embodiments of aerosol delivery devices include an electrical power source. Further, some embodiments of aerosol delivery devices may include a control body and a cartridge. The electrical power source may be rechargeable. Further, the cartridge may be refilled or replaced. Accordingly, aerosol delivery devices or portions thereof may be reused and/or aerosol delivery devices may include multiple separable components. Thus, it may be desirable to provide aerosol delivery devices with accessories configured to recharge the aerosol delivery device and/or conveniently transport the separable components of the aerosol delivery device.

BRIEF SUMMARY OF THE DISCLOSURE

The present disclosure relates to aerosol delivery devices which, in certain embodiments, may be characterized as electronic cigarettes. More particularly, the present disclosure relates to accessories that may be used in conjunction with an aerosol delivery device to store and/or recharge the aerosol delivery device. In one aspect an aerosol delivery device accessory is provided. The accessory may include a housing, Further, the accessory may include a drawer assembly received in the housing. The accessory may additionally include an electrical power source engaged with the drawer assembly. The accessory may further include a connector engaged with the drawer assembly. The connector may be electrically coupled to the electrical power source and configured to engage an aerosol delivery device to charge the aerosol delivery device. The drawer assembly being movable with respect to the housing from an extended configuration in which the connector is accessible to a retracted configuration in which the housing is substantially enclosed.

In some embodiments the drawer assembly may define a storage compartment configured to receive a cartridge. Further, the accessory may include a slider configured to engage at least a portion of the aerosol delivery device. The slider may be configured to move the portion of the aerosol delivery device from a recessed position in which the portion of the aerosol delivery device is received in the housing to an extended position in which the portion of the aerosol delivery device at least partially extends out of the housing. The slider may be configured to engage a cartridge of the aerosol delivery device. The slider may be positioned adjacent to the drawer assembly in the housing. The slider may be independently moveable relative to the drawer assembly.

In some embodiments the connector may be configured to engage a control body of the aerosol delivery device. Further, the accessory may include a coupler configured to engage a cartridge of the aerosol delivery device. The coupler may be engaged with a slider configured to move the cartridge from a recessed position in which the cartridge is received in the housing to an extended position in which the cartridge at least partially extends out of the housing. The slider may extend out of the housing.

In some embodiments the accessory may further include a power meter configured to display a power level of one or both of the electrical power source and the aerosol delivery device. Additionally, the accessory may include a control circuit configured to control charging of the aerosol delivery device.

In an additional aspect a method for assembling an aerosol delivery device accessory is provided. The method may include electrically coupling an electrical power source and a connector. The connector may be configured to engage an aerosol delivery device to charge the aerosol delivery device. Further, the method may include engaging the connector and the electrical power source with a drawer assembly. The method may additionally include inserting the drawer assembly into a housing. The drawer assembly may be movable with respect to the housing from an extended configuration in which the connector is accessible to a retracted configuration in which the housing is substantially enclosed.

In some embodiments the method may further include assembling the drawer assembly. Assembling the drawer assembly may include engaging a drawer cover with a drawer base. Additionally, the method may include electrically coupling a power meter with at least one of the electrical power source and the connector. The power meter may be configured to display a power level of one or both of the electrical power source and the aerosol delivery device.

In some embodiments the method may further include positioning a slider in the housing. The slider may be configured to engage at least a portion of the aerosol delivery device. Further, the slider may be configured to move the portion of the aerosol delivery device from a recessed position in which the portion of the aerosol delivery device is received in the housing to an extended position in which the portion of the aerosol delivery device at least partially extends out of the housing. Positioning the slider in the housing may include positioning the slider adjacent to the drawer assembly.

In some embodiments inserting the drawer assembly into the housing may include positioning the drawer assembly between a first housing portion and a second housing portion and engaging the first housing portion with the second housing portion. The method may additionally include positioning a coupler in the housing. The coupler may be configured to engage a cartridge of the aerosol delivery device. Positioning the coupler in the housing may include positioning a slider in the housing. The slider may be engaged with the coupler and configured to move the cartridge from a recessed position in which the cartridge is received in the housing to an extended position in which the cartridge at least partially extends out of the housing.

These and other features, aspects, and advantages of the disclosure will be apparent from a reading of the following detailed description together with the accompanying drawings, which are briefly described below.

BRIEF DESCRIPTION OF THE FIGURES

Figure 1:
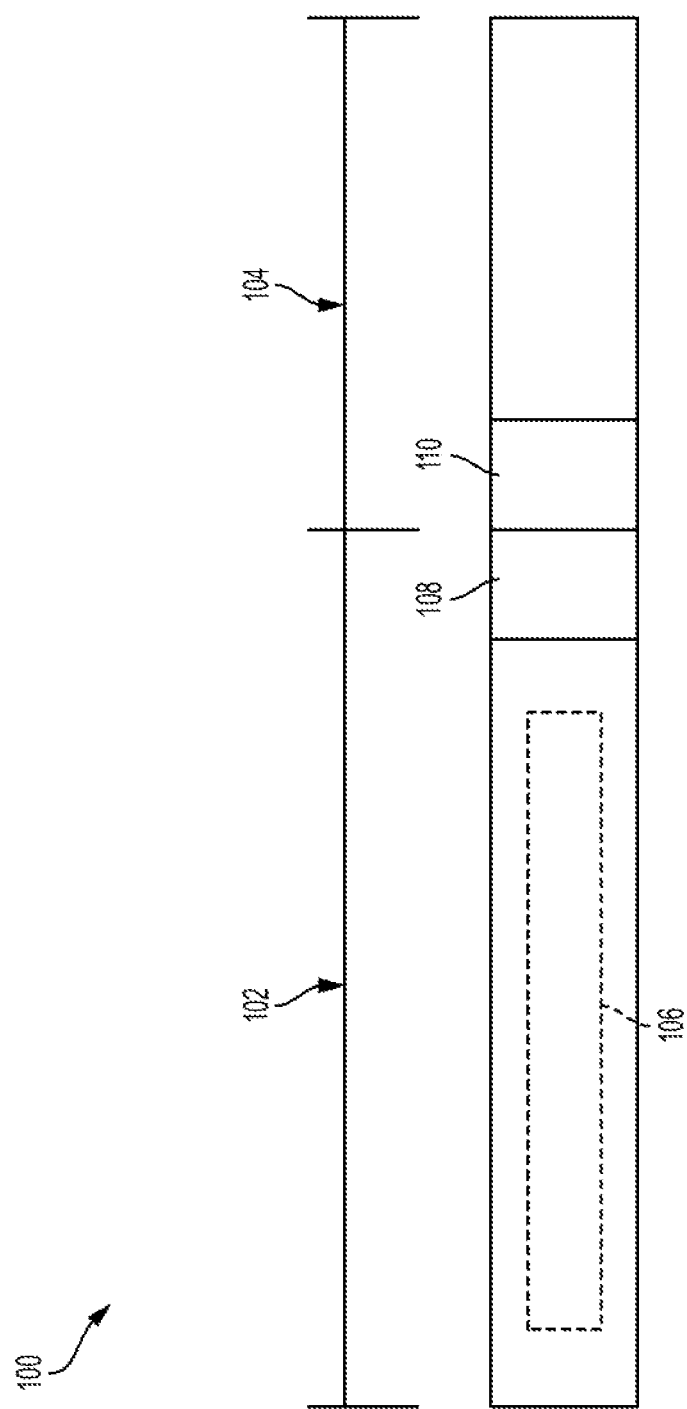
Figure 2:
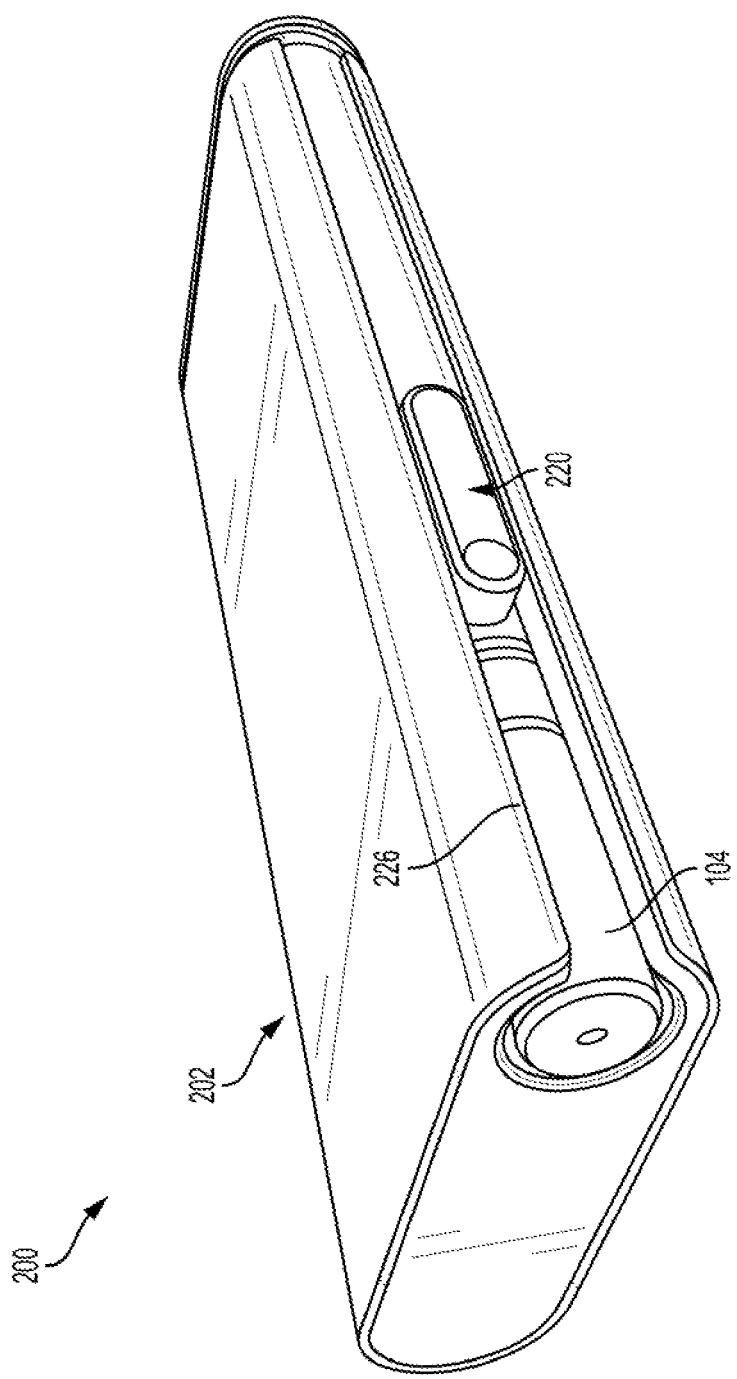
Figure 3:
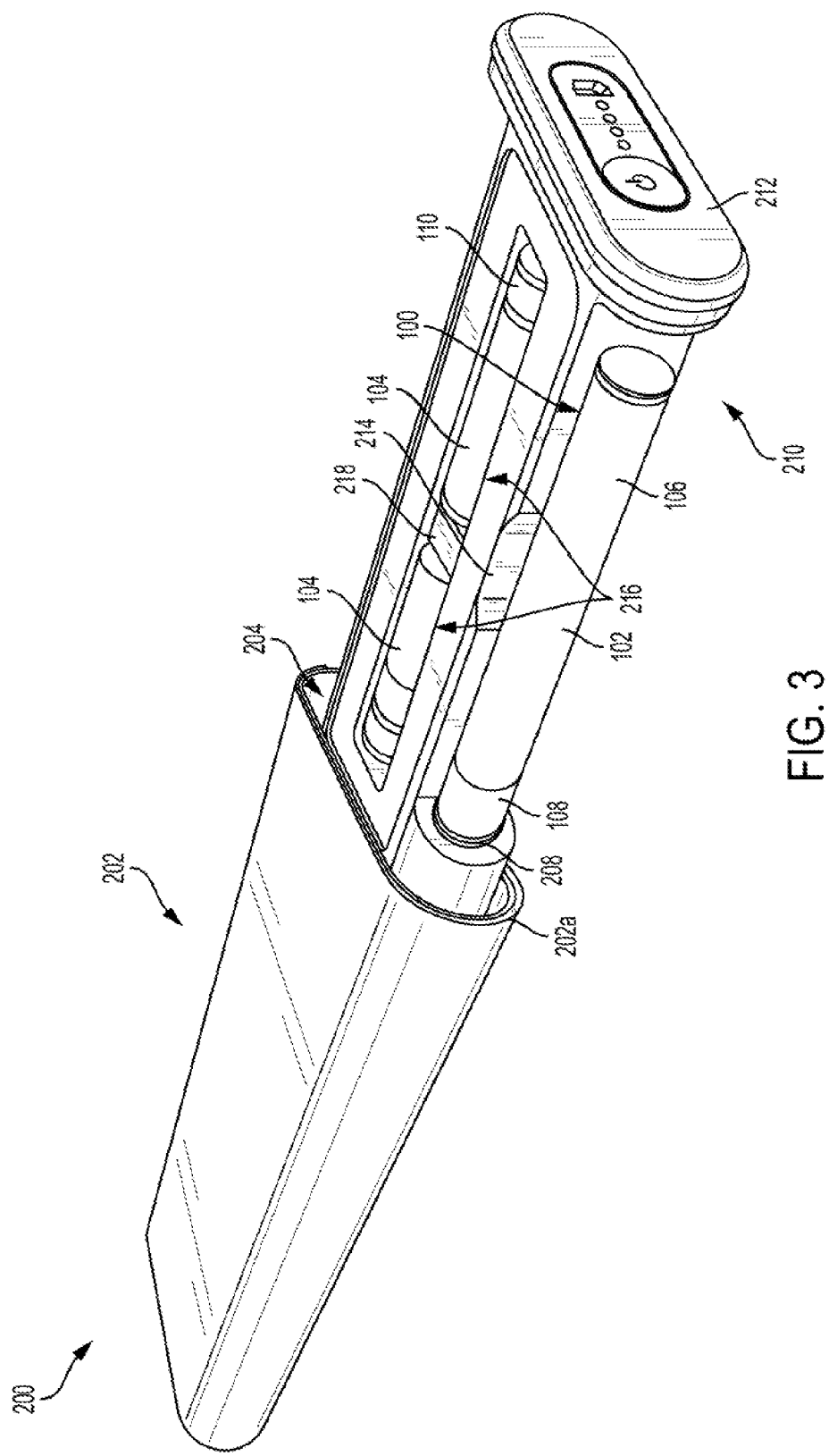
Figure 4:
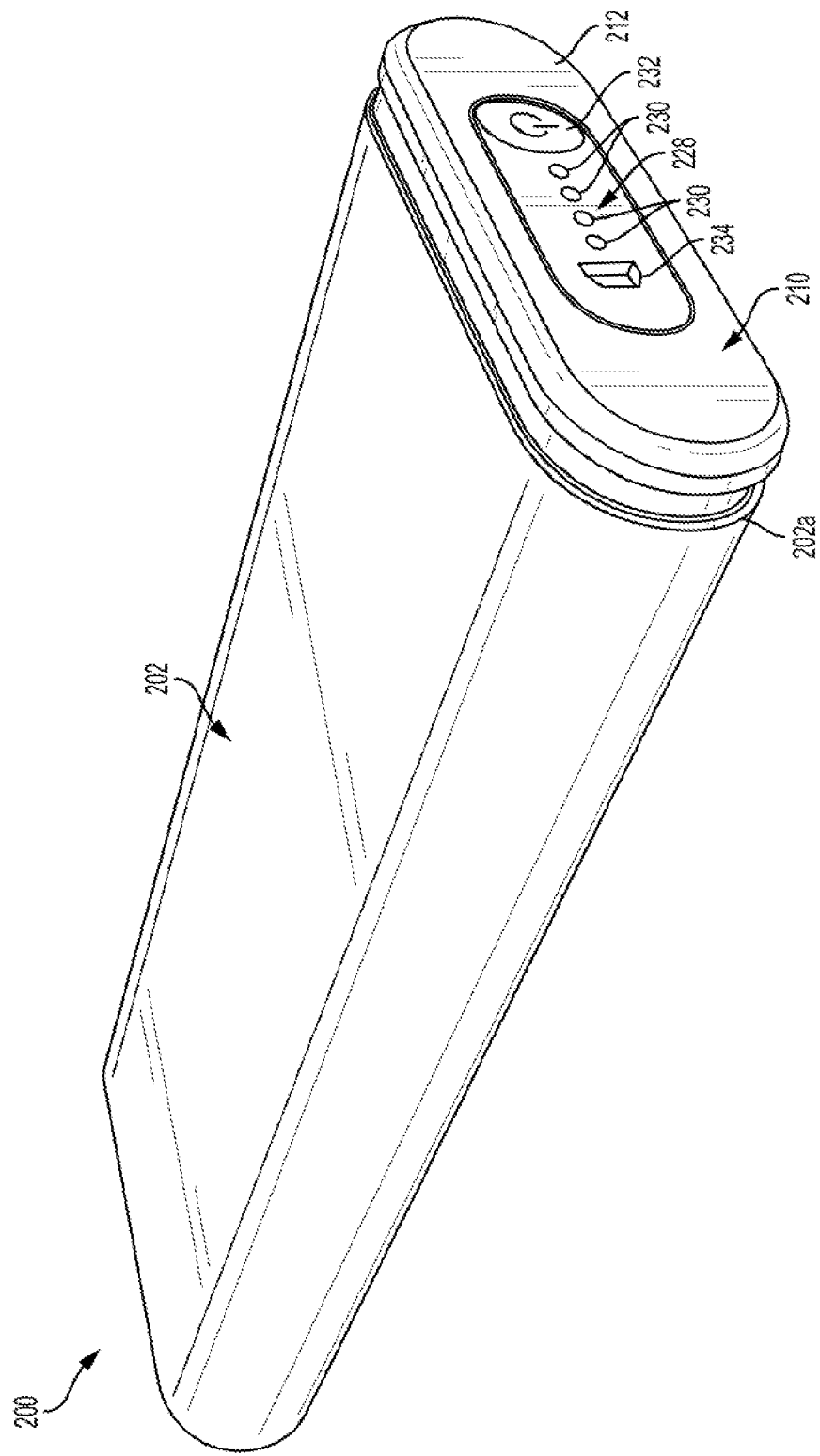
Figure 5:
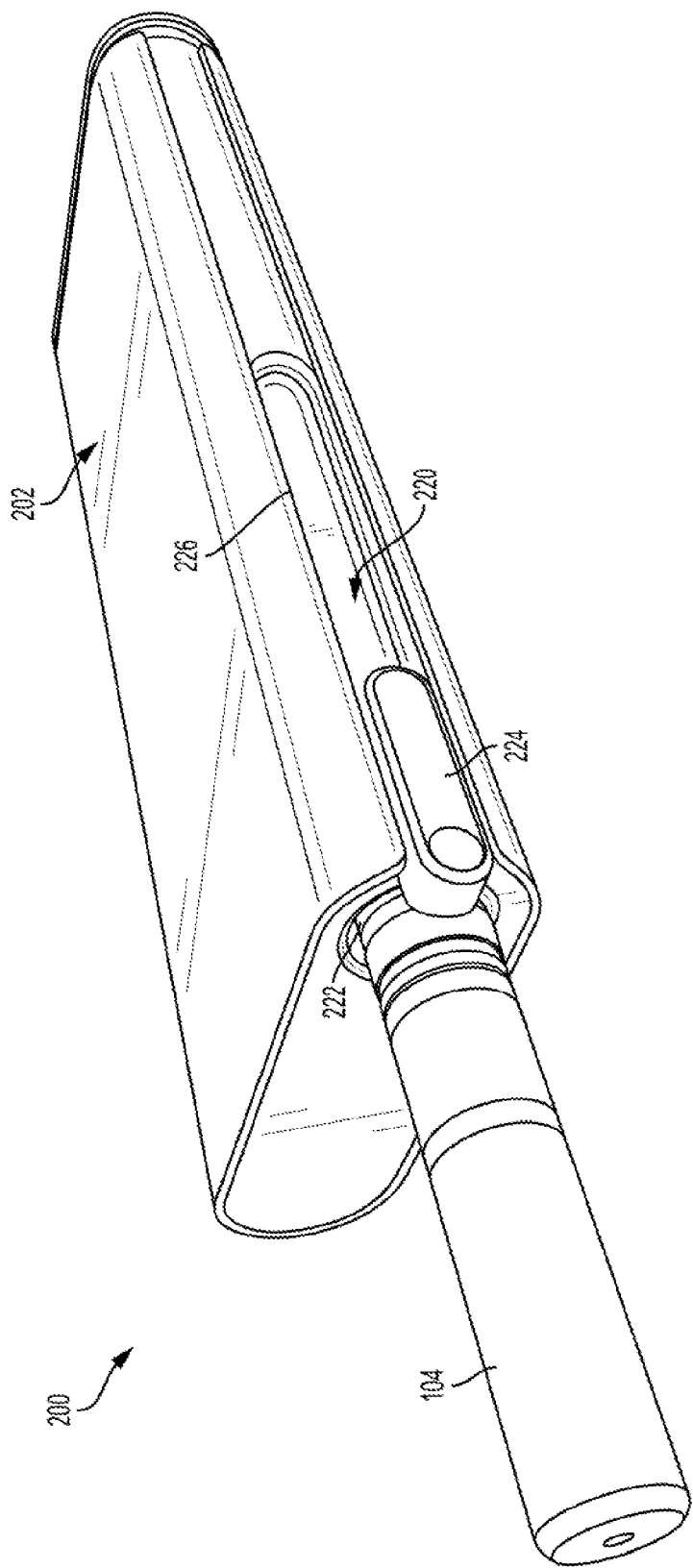
Figure 6:
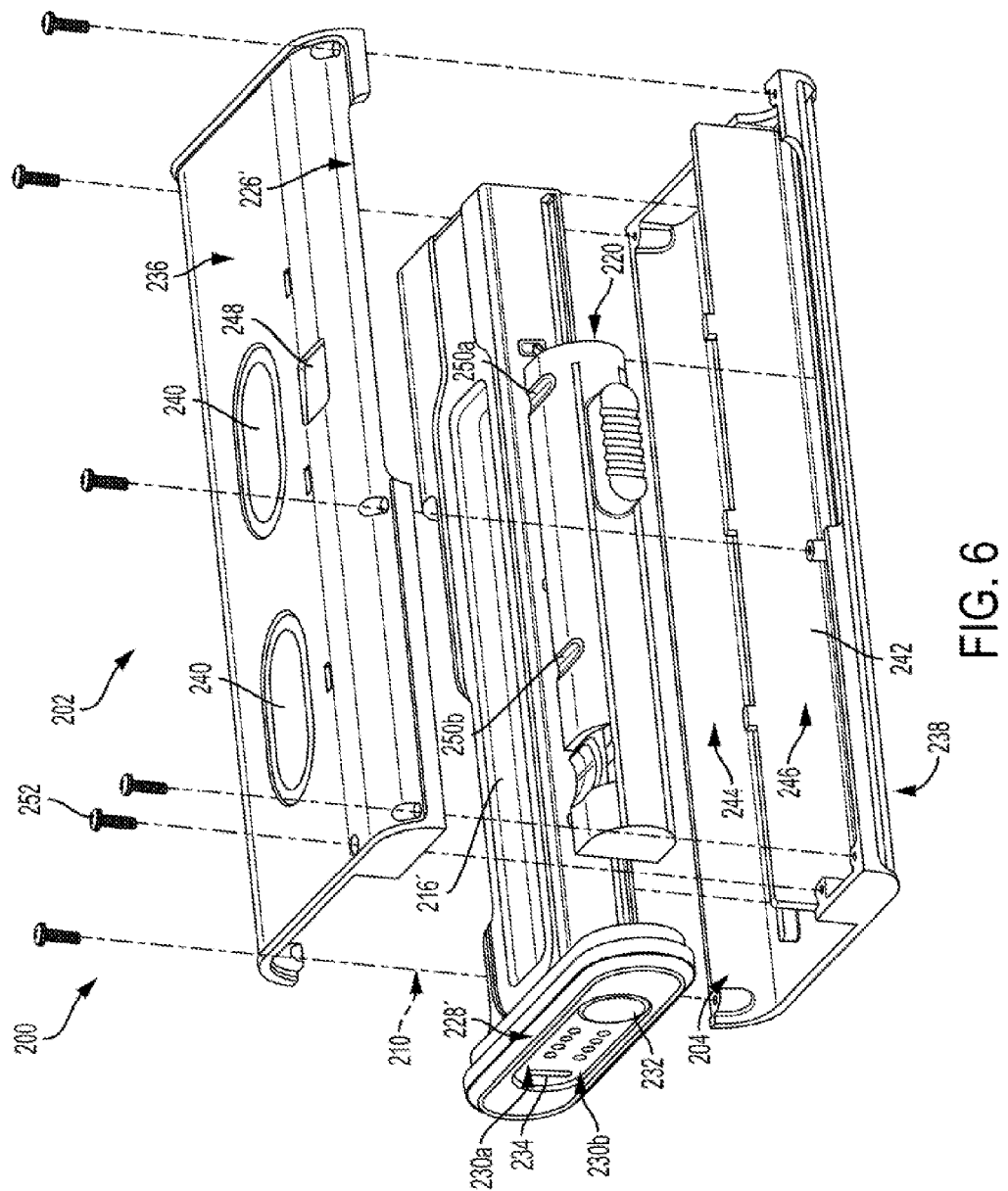
Figure 7:
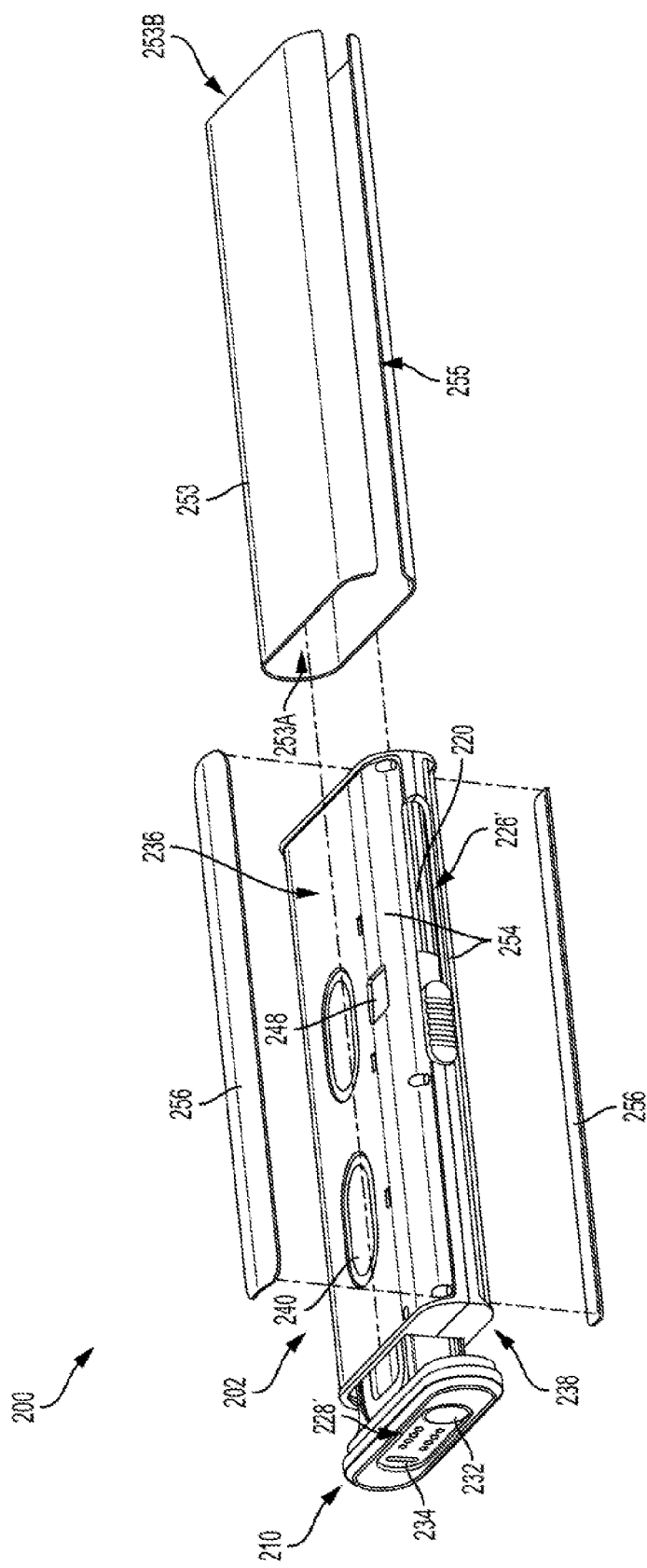
Figure 8:
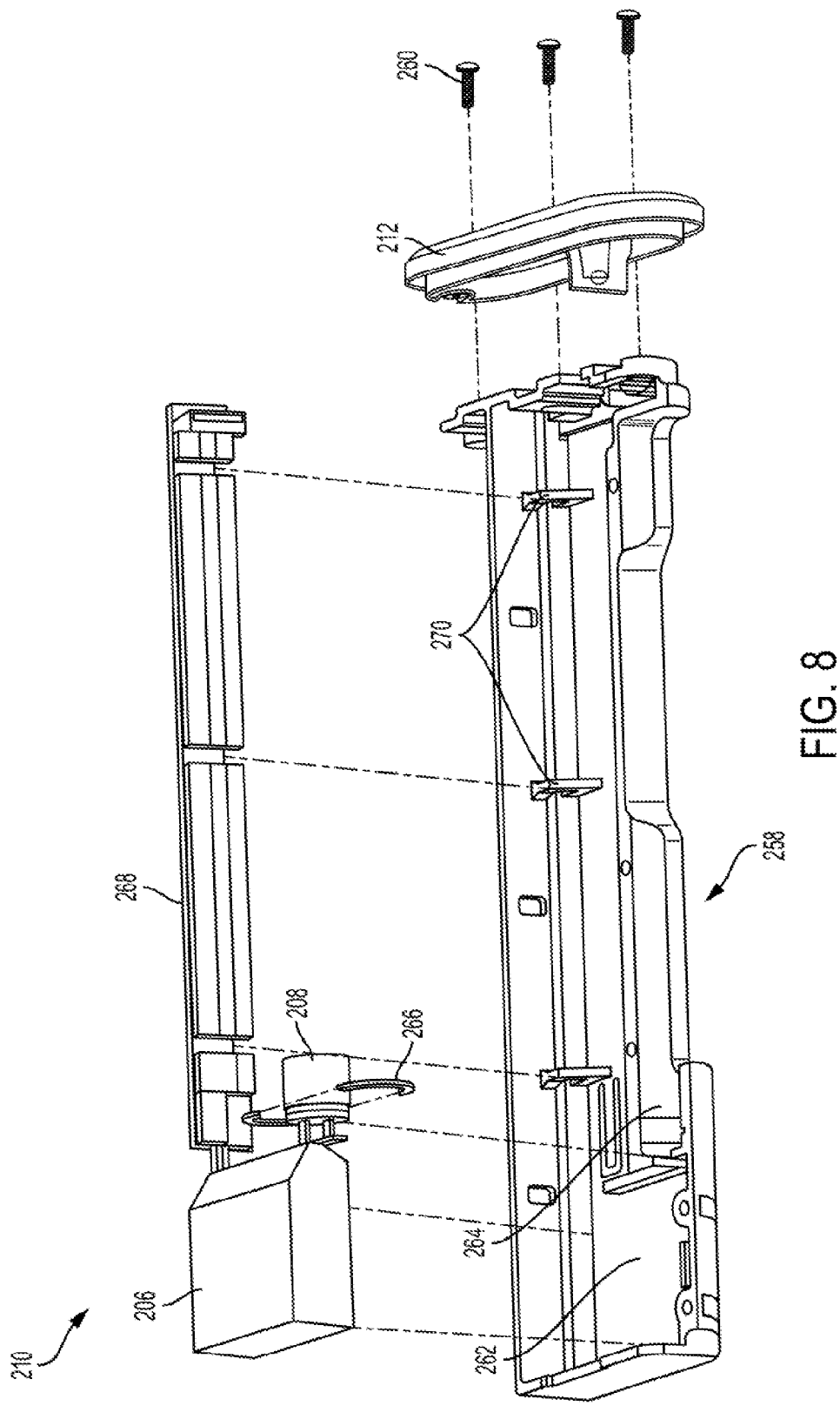
Figure 9:
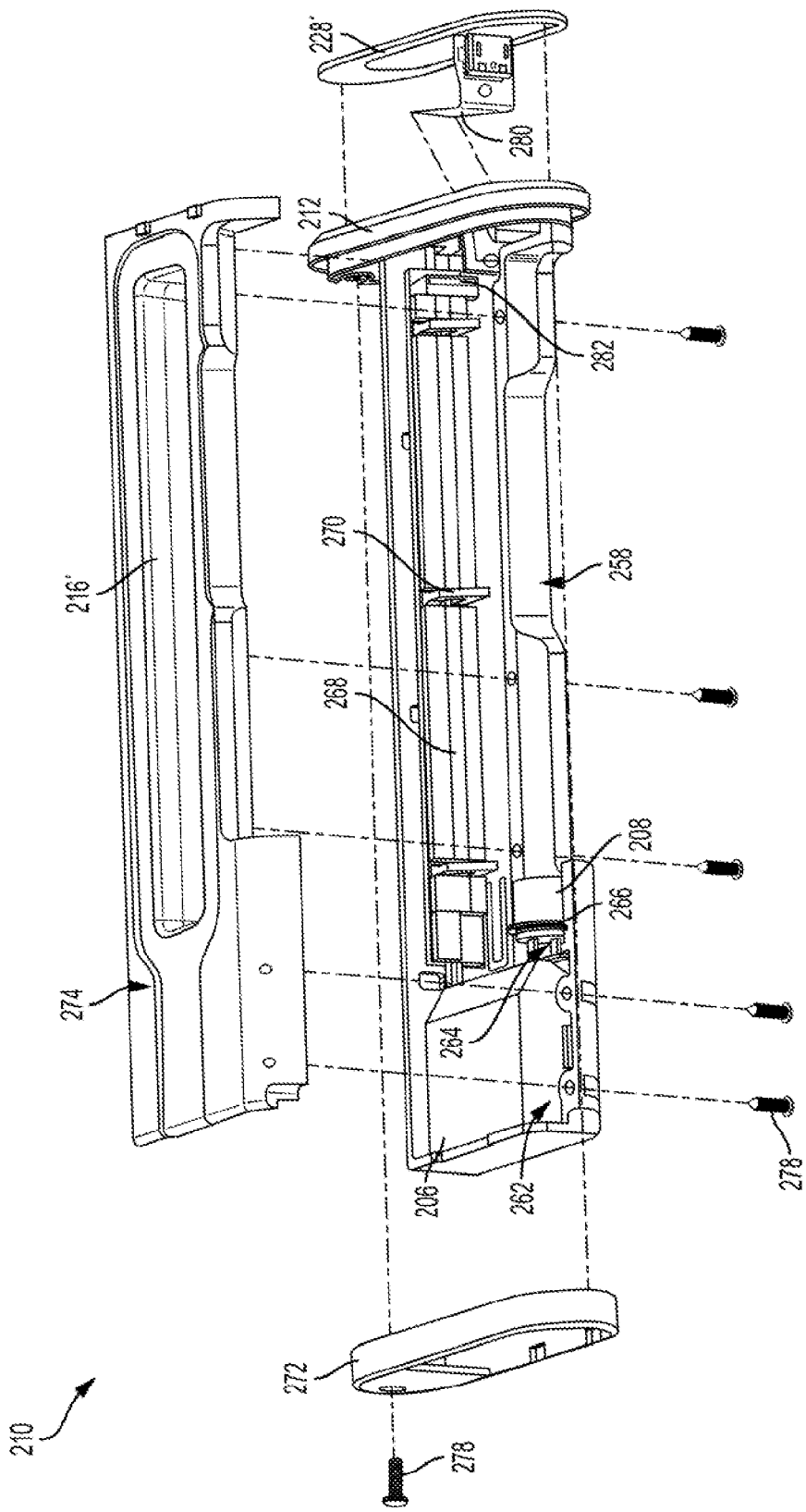
Figure 10:
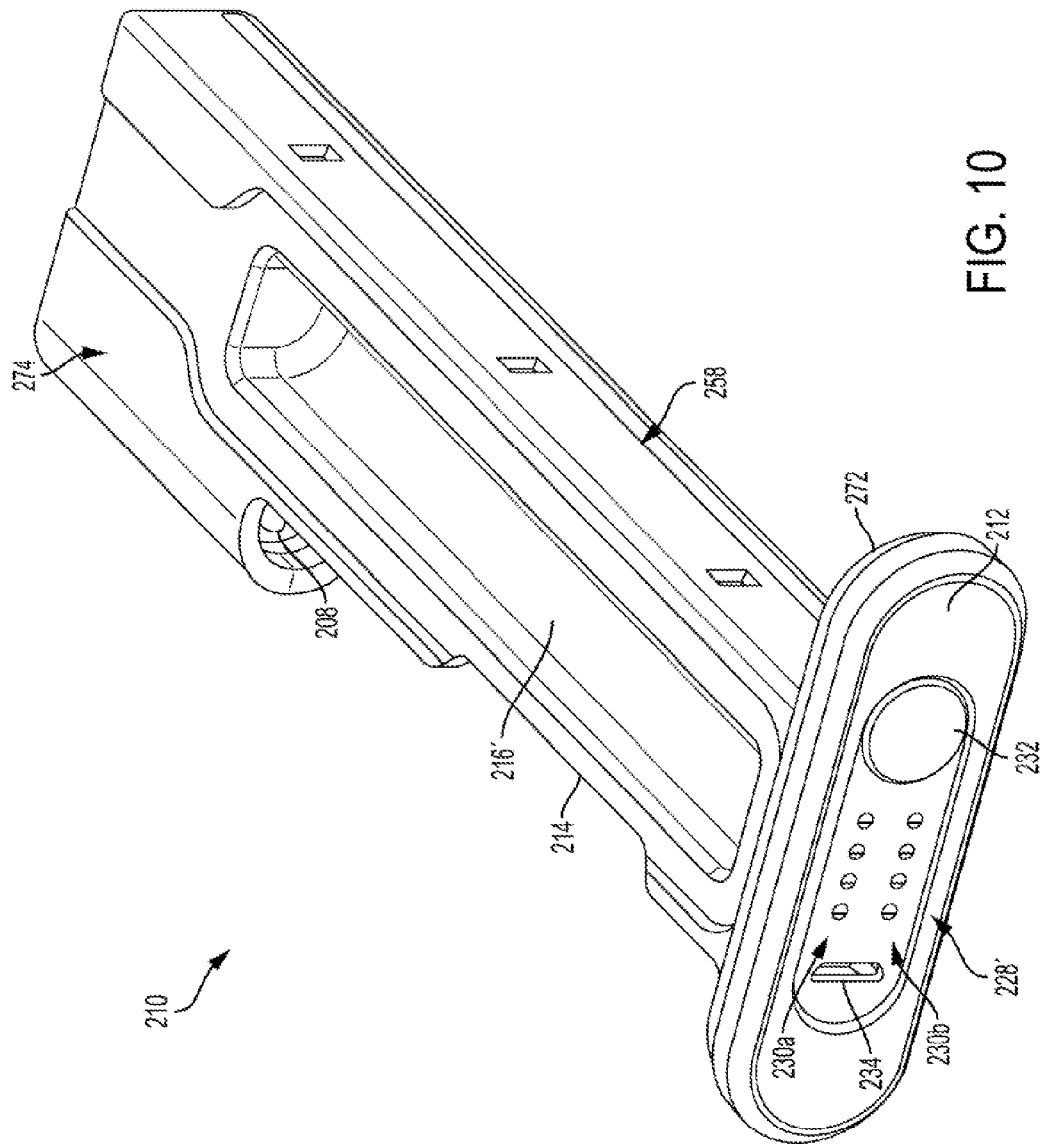
Figure 11:
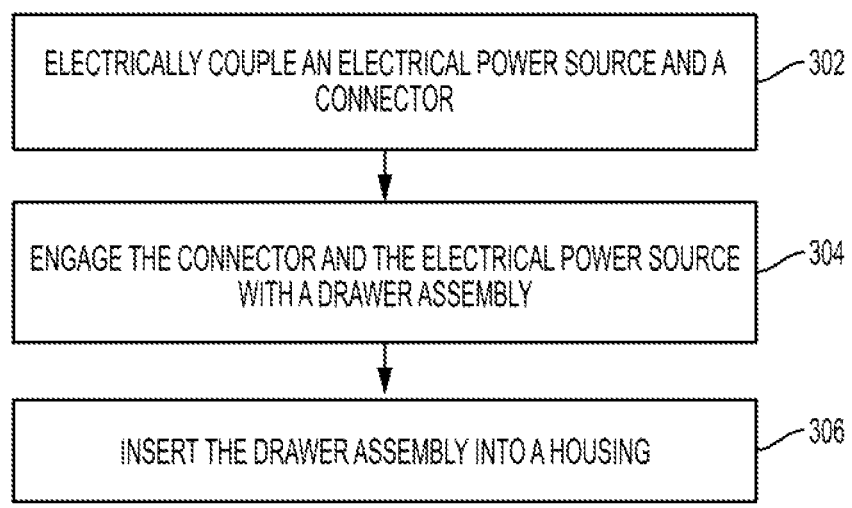

Having thus described the disclosure in the foregoing general terms, reference will now be made to the accompanying drawings, which are not necessarily drawn to scale, and wherein:

FIG. 1 illustrates a side view of an aerosol delivery device including an example embodiment of the present disclosure;

FIG. 2 illustrates a perspective view of an aerosol delivery device accessory wherein a slider configured to engage a cartridge of an aerosol delivery device is in a recessed position according to an example embodiment of the present disclosure;

FIG. 3 illustrates a perspective view of the accessory of FIG. 2 wherein a drawer assembly configured to receive a control body of an aerosol delivery device is in an extended configuration according to an example embodiment of the present disclosure;

FIG. 4 illustrates a perspective view of the accessory of FIG. 2 wherein the drawer assembly is in a retracted configuration according to an example embodiment of the present disclosure;

FIG. 5 illustrates a perspective view of the accessory of FIG. 2 wherein the slider is in an extended position according to an example embodiment of the present disclosure;

FIG. 6 illustrates a partially-exploded view of the accessory of FIG. 2 wherein the drawer assembly is in an assembled configuration according to an example embodiment of the present disclosure;

FIG. 7 illustrates a partially-exploded view of the accessory of FIG. 2 wherein the drawer assembly and a housing are shown in an assembled configuration according to an example embodiment of the present disclosure;

FIG. 8 illustrates a partial, exploded view of the drawer assembly of the accessory of FIG. 2 according to an example embodiment of the present disclosure;

FIG. 9 illustrates a partially-exploded view of the drawer assembly of the accessory of FIG. 2 according to an example embodiment of the present disclosure;

FIG. 10 illustrates a perspective view of the drawer assembly of the accessory of FIG. 2 according to an example embodiment of the present disclosure; and FIG. 11 illustrates a method for assembling an aerosol delivery device accessory according to an example embodiment of the present disclosure.

DETAILED DESCRIPTION OF PREFERRED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural variations unless the context clearly dictates otherwise.

As described hereinafter, the present disclosure is directed to an accessory for an aerosol delivery device. The accessory may be employed with various embodiments of aerosol delivery devices. Accordingly, it should be understood that the aerosol delivery devices discussed herein are described by way of example only, and the accessory may be employed with various other embodiments of aerosol delivery devices.

Aerosol delivery devices according to the present disclosure may use electrical energy to heat a material (preferably without combusting the material to any significant degree) to form an inhalable substance; such articles most preferably being sufficiently compact to be considered "hand-held" devices. An aerosol delivery device may provide some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device. The aerosol delivery device may not produce smoke in the sense of the aerosol resulting from by-products of combustion or pyrolysis of tobacco, but rather, that the article or device most preferably yields vapors (including vapors within aerosols that can be considered to be visible aerosols that might be considered to be described as smoke-like) resulting from volatilization or vaporization of certain components of the article or device, although in other embodiments the aerosol may not be visible. In highly preferred embodiments, aerosol delivery devices may incorporate tobacco and/or components derived from tobacco. As such, the aerosol delivery device can be characterized as an electronic smoking article such as an electronic cigarette.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, an aerosol delivery device of the present disclosure can be hand-held by a user, a user can draw on a portion of the article for inhalation of aerosol produced by that article, a user can take puffs at selected intervals of time, and the like.

Aerosol delivery devices of the present disclosure generally include a housing and a number of additional components coupled thereto and/or positioned within the housing, and some of the components may be removable or replaceable. The overall design of the housing can vary, and the overall size and shape of the housing can vary. The smoking articles can include a cartridge, which can be defined by an outer body or cover—e.g., an elongated body resembling the shape of a portion of a cigarette or cigar. For example, an outer cover or body of the cartridge can be substantially tubular in shape and, as such, resemble the shape of a conventional cigarette or cigar. However, various other shapes and configurations may be employed such as, by way of example, substantially rectangular configurations. In some embodiments, the housing may contain one or more reusable components (e.g., a rechargeable battery and various electronics for controlling the operation of that article), and the cartridge can be removable, refillable, and/or disposable.

Aerosol delivery devices of the present disclosure most preferably comprise some combination of a power source (i.e., an electrical power source), at least one control component (e.g., means for actuating, controlling, regulating and/or ceasing power for heat generation, such as by controlling electrical current flow from the power source to other components of the aerosol delivery device), a heater or heat generation component (e.g., an electrical resistance heating element or component commonly referred to as part of an "atomizer"), and an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined air flow path through the article such that aerosol generated can be withdrawn therefrom upon draw). When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof.

As noted above, the aerosol delivery device may incorporate a battery and/or other electrical power source (e.g., a capacitor) to provide current flow sufficient to provide various functionalities to the aerosol delivery device, such as powering of a heater, powering of control systems, powering of indicators, and the like. The power source can take on various embodiments. Preferably, the power source is able to deliver sufficient power to rapidly heat the heating element to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience. A battery for use in the present devices may be replaceable, removable, and/or rechargeable and thus may be combined with any type of recharging technology, including connection to a typical alternating current electrical outlet, connection to a car charger (i.e., a cigarette lighter receptacle), and connection to a computer, such as through a universal serial bus (USB) cable or connector. In one preferred embodiment the electrical power source comprises a lithium-ion battery, which may be relatively lightweight, rechargeable, and provide a relatively large energy storage capacity. Examples of electrical power sources are described in U.S. Pat. App. Pub. No. 2010/0028766 to Peckerar et al., the disclosure of which is incorporated herein by reference in its entirety.

An aerosol delivery device according to the present disclosure preferably incorporates a sensor or detector for control of supply of electric power to a heat generation element when aerosol generation is desired (e.g., upon draw during use). As such, for example, there is provided a manner or method for turning off the power supply to the heat generation element when the aerosol generating piece is not be drawn upon during use, and for turning on the power supply to actuate or trigger the generation of heat by the heat generation element during draw. For example, with respect to a flow sensor, representative current regulating components and other current controlling components including various microcontrollers, sensors, and switches for aerosol delivery devices are described in U.S. Pat. No. 4,735,217 to Gerth et al.; U.S. Pat. No. 4,947,874 to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al.; U.S. Pat. No. 8,205,622 to Pan; and U.S. Pat. No. 8,881,737 to Collet et al.; U.S. Pat. Pub. Nos. 2009/0230117 to Fernando et al.; and 2014/0270727 to Ampolini et al.; and 2015/0257445 to Henry et al.; which are incorporated herein by reference in their entireties. Additional representative types of sensing or detection mechanisms, structures, components, configurations, and general methods of operation thereof, are described in U.S. Pat. No. 5,261,424 to Sprinkel, Jr.; U.S. Pat. No. 5,372,148 to McCafferty et al.; and PCT WO 2010/003480 to Flick; which are incorporated herein by reference in their entireties.

In some embodiments, the aerosol delivery device can include an indicator, which may comprise one or more light emitting diodes. The indicator can be in communication with the control component through a connector circuit and illuminate, for example, during a user draw on the mouthend as detected by the flow sensor.

Various elements that may be included in the housing are described in U.S. App. Pub. No. 2015/0245658 to Worm et al., which is incorporated herein by reference in its entirety. Still further components can be utilized in the aerosol delivery device of the present disclosure. For example, U.S. Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating; U.S. Pat. No. 5,372,148 to McCafferty et al. discloses a puff sensor for controlling energy flow into a heating load array in response to a pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and WO 2010/003480 to Flick discloses a fluid flow sensing system indicative of a puff in an aerosol generating system; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254; 8,925,555 to Monsees et al.; and U.S. Pat. No. 9,220,302 to DePiano et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; WO 2010/091593 to Hon; and WO 2013/089551 to Foo, each of which is incorporated herein by reference in its entirety.

The aerosol precursor composition, also referred to as a vapor precursor composition, may comprise a variety of components including, by way of example, any of a polyhydric alcohol (e.g., glycerin, propylene glycol, or a mixture thereof), nicotine, tobacco, tobacco extract, and/or flavorants. Various components that may be included in the aerosol precursor composition are described in U.S. Pat. No. 7,726,320 to Robinson et al., which is incorporated herein by reference in its entirety. Additional representative types of aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference in their entireties. Other aerosol precursors which may be employed in the aerosol delivery device of the present disclosure include the aerosol precursors included in the VUSE® product by R. J. Reynolds Vapor Company, the BLU™ product by Lorillard Technologies, the Mistic Menthol product by Mistic Ecigs, and the Vype product by CN Creative Ltd. Also desirable are the so-called "Smoke Juices" for electronic cigarettes that have been available from Johnson Creek Enterprises LLC. Additional exemplary formulations for aerosol precursor materials that may be used according to the present disclosure are described in U.S. Pat. Pub. No. 2013/0008457 to Zheng et al., and U.S. Pat. Pub. No. 2013/0213417 to Chong et al., the disclosures of which are incorporated herein by reference in their entireties.

The aerosol delivery device preferably includes a reservoir. In some embodiments, a reservoir may comprise a container for storing a liquid aerosol precursor, a fibrous substrate, or a combination of a fibrous substrate and a container. A fibrous substrate suitable for use as a reservoir may comprise a plurality of layers of nonwoven fibers and may be formed substantially into the shape of a tube. For example, the formed tube may be shaped and sized for placement within the outer body or cover of a cartridge for use in the aerosol delivery device. Liquid components, for example, can be sorptively retained by the fibrous substrate and/or be retained within a reservoir container. The reservoir preferably is in fluid connection with a liquid transport element. Thus, the liquid transport element may be configured to transport liquid from the reservoir to a heating element, such as via capillary action and/or via active transport—e.g., pumping or controlled movement with a valve. Representative types of substrates, reservoirs, or other components for supporting the aerosol precursor are described in U.S. Pat. No. 8,528,569 to Newton and U.S. Pat. No. 8,715,070 to Davis et al.; and U.S. Pat. App. Pub. Nos. 2014/0261487 to Chapman et al. and 2015/0216232 to Bless et al., which are incorporated herein by reference in their entireties.

The liquid transport element may be in direct contact with the heating element. Various wicking materials, and the configuration and operation of those wicking materials within certain types of aerosol delivery devices, are set forth in U.S. Pat. No. 8,910,640 to Sears et al., which is incorporated herein by reference in its entirety. A variety of the materials disclosed by the foregoing documents may be incorporated into the present devices in various embodiments, and all of the foregoing disclosures are incorporated herein by reference in their entireties.

The heating element may comprise a wire defining a plurality of coils wound about the liquid transport element. In some embodiments the heating element may be formed by winding the wire about the liquid transport element as described in U.S. Pat. No. 9,210,738 to Ward et al, which is incorporated herein by reference in its entirety. Further, in some embodiments the wire may define a variable coil spacing, as described in U.S. Pat. App. Pub. No. 2014/0270730 to DePiano et al., which is incorporated herein by reference in its entirety. Various embodiments of materials configured to produce heat when electrical current is applied therethrough may be employed to form the heating element. Example materials from which the wire coil may be formed include titanium, platinum, silver, palladium, Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials; and ceramic (e.g., a positive or negative temperature coefficient ceramic). The heating element may comprise a wire defining a mesh, screen or lattice structure positioned about the liquid transport element. Example materials from which the wire mesh, screen, or lattice may be formed include titanium, platinum, silver, palladium, Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials; and ceramic (e.g., a positive or negative temperature coefficient ceramic). An example embodiment of a mesh heating element is disclosed in U.S. Pat. Appl. Pub. No. 2015/0034103 to Hon. In some embodiments, a stamped heating element may be employed in the atomizer, as described in U.S. Pat. Pub. No. 2014/0270729 to DePiano et al., which is incorporated herein by reference in its entirety. Further to the above, additional representative heating elements and materials for use therein are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties. Further, chemical heating may be employed in other embodiments. Various additional examples of heaters and materials employed to form heaters are described in U.S. Pat. No. 8,881,737 to Collett et al., which is incorporated herein by reference, as noted above.

A variety of heater components may be used in the present aerosol delivery device. In various embodiments, one or more microheaters or like solid state heaters may be used. Embodiments of microheaters and atomizers incorporating microheaters suitable for use in the presently disclosed devices are described in U.S. Pat. No. 8,881,737 to Collett et al., which is incorporated herein by reference in its entirety.

One or more heating terminals (e.g., positive and negative terminals) may connect to the heating element so as to form an electrical connection with the power source and/or a terminal may connect to one or more control elements of the aerosol delivery device. Further, various examples of electronic control components and functions performed thereby are described in U.S. Pat. App. Pub. No. 2014/0096781 to Sears et al., which is incorporated herein by reference in its entirety.

Various components of an aerosol delivery device according to the present disclosure can be chosen from components described in the art and commercially available. Reference is made for example to the reservoir and heater system for controllable delivery of multiple aerosolizable materials in an electronic smoking article disclosed in U.S. Pat. App. Pub. No. 2014/0000638 to Sebastian et al., which is incorporated herein by reference in its entirety.

In further embodiments, one or more components of the aerosol delivery device may be formed from one or more carbon materials, which may provide advantages in terms of biodegradability and absence of wires. In this regard, the heating element may comprise carbon foam, the reservoir may comprise carbonized fabric, and graphite may be employed to form an electrical connection with the battery and controller. An example embodiment of a carbon-based cartridge is provided in U.S. Pat. App. Pub. No. 2013/0255702 to Griffith et al., which is incorporated herein by reference in its entirety.

A side view of an example embodiment of an aerosol delivery device 100 is illustrated in FIG. 1. As illustrated, the aerosol delivery device 100 may include a control body 102 and a cartridge 104. In a coupled configuration the cartridge 104 and the control body 102 may engage one another in an end-to-end relationship whereby a longitudinal end of the cartridge engages a longitudinal end of the control body. In this regard, in some embodiments the aerosol delivery device 100 may define a generally cylindrical configuration. However, in other embodiments the aerosol delivery device may define other shapes and configurations.

As described above, the aerosol delivery device 100 may include an electrical power source 106 (e.g., a battery and/or a capacitor) that may output current to heat an aerosol precursor composition, which may be stored in the cartridge 104, to produce an aerosol which may be received by a user drawing on the aerosol delivery device. For example, the cartridge 104 may include a reservoir and/or a reservoir substrate that holds the aerosol precursor composition therein. The electrical power source 106 may be rechargeable and may be included in the control body 102. Further, the cartridge 104 may be releasably attached to the control body 102 such that the cartridge may be replaced or refilled. In this regard, the control body 102 may include a coupler 108 and the cartridge 104 may include a base 110. Thereby, the base 110 may engage the coupler 108 to releasably engage the cartridge 104 with the control body 102.

The present disclosure provides an accessory configured to recharge the electrical power source of an aerosol delivery device, which may be referred to as a primary electrical power source) and/or store the components of the aerosol delivery device. Thus, the accessory may be employed in conjunction with the aerosol delivery device 100 or other embodiments of aerosol delivery devices.

In this regard, FIG. 2 illustrates an aerosol delivery device accessory 200 according to an example embodiment of the present disclosure. The accessory 200 may include a housing 202. The housing 202 may define a protective outer portion of the accessory 200.

As illustrated in FIG. 3, the housing 202 may define a cavity 204. The cavity 204 may be configured to receive an electrical power source 206 (see, e.g., FIG. 8), which may also be referred to as an auxiliary electrical power source. In this regard, the electrical power source 206 may be configured to charge the electrical power source 106 (see, FIG. 1) of the aerosol delivery device 100.

As further illustrated in FIG. 3, the accessory 200 may include a connector 208. The connector 208 may be electrically coupled to the electrical power source 206 (see, e.g., FIG. 8). The connector 208 may be configured to engage an aerosol delivery device 100. In this regard, the cavity 204 may be configured to receive the aerosol delivery device 100, or a portion thereof. When the aerosol delivery device 100 is engaged with the connector 208, current from the electrical power source 206 (see, e.g., FIG. 8) of the accessory 200 may charge the aerosol delivery device 100.

In this regard, the connector 208 may be configured to engage the aerosol delivery device 100 to direct current from the electrical power source 206 to the aerosol delivery device. In some embodiments, as illustrated, the connector 208 may be configured to engage the control body 102 of the aerosol delivery device 100. For example, the connector 208 may be configured to engage the coupler 108 of the control body 102. In this regard, as described above, the coupler 108 of the control body 102 may be configured to engage the base 110 of the cartridge 204 to couple the control body to the base.

However, when the cartridge 104 is decoupled from the control body 102, the coupler 108 may be free to be engaged with the connector 208. Thereby, the electrical power source 106 of the aerosol delivery device 100 may be charged without requiring provisions for an additional electrical connector at the control body 102. Thus, the aerosol delivery device 100 may be charged by the accessory 200 without modification or redesign of the aerosol delivery device in some embodiments.

As further illustrated in FIG. 3, in some embodiments the accessory 200 may include a drawer assembly 210. The connector 208 and the electrical power source 206 (see, e.g., FIG. 8) may be engaged with the drawer assembly 210. Thereby, the control body 102 of the aerosol delivery device 100 may engage the connector 208 to move therewith in the manner described below.

In this regard, the drawer assembly 210 may be movable with respect to the housing 202 from an extended configuration illustrated in FIG. 3 to a retracted configuration illustrated in FIG. 4. In the extended configuration, the drawer 210 may extend out of the cavity 204 defined by the housing 202. However, contact between the drawer assembly 210 and the housing 202 may prevent the drawer assembly from fully extending out of the cavity 204 and separating from the housing.

Conversely, when the drawer assembly 210 is in the retracted configuration, the cavity 204 is substantially enclosed. In this regard, the drawer assembly 210 may comprise an outer end wall 212. The housing 202 may be substantially enclosed except at an open end 202a. Thereby, the outer end wall 212 of the drawer assembly 210 may engage the open end 202a of the housing 202 to substantially enclose the cavity 204 when the drawer assembly is in the retracted configuration.

The aerosol delivery device 100 may be engaged with the drawer assembly 210 via the connector 208 when the drawer assembly is in the extended configuration. The drawer assembly 210 may define a void extending away from the connector 208 to allow for engagement of the control body 102 with the connector. Further, as illustrated in FIG. 3, the drawer assembly 210 may define a recess 214 proximate the connector 208. The recess 214 may provide open space between the control body 102 and the drawer assembly 210 that may receive a user's fingers to facilitate engagement and disengagement of the control body with the connector 108.

The aerosol delivery device 100 may be stored in the cavity 204 and protected by the housing 202 when the drawer assembly 210 is moved to the retracted configuration. In this regard, the aerosol delivery device 100 (or a portion thereof) engaged with the drawer assembly 210 via the connector 208 may be substantially enclosed in the cavity 204 by the housing 202 and the drawer assembly when the drawer assembly is in the retracted configuration.

Additionally, the accessory 200 may recharge the electrical power source 106 of the aerosol delivery device 100 when a user engages the coupler 108 of the control body 102 with the connector 208. As illustrated, the drawer assembly 210 may define one or more storage compartments 216. The storage compartments 216 may be configured to receive a cartridge 104. Thereby, when the cartridge 104 is disengaged from the control body 102 in order to allow for engagement of the control body with the connector 208, the cartridge may be received in one of the storage compartments 216. Further, one or more additional cartridges 104 may be received in any additional storage compartments 216. In some embodiments the storage compartments 216 may be separated by a spacer 218. Thereby, each storage compartment 216 may define dimensions substantially corresponding to the dimensions of one of the cartridges 104, such that when the drawer assembly 210 includes a fewer number of cartridges 104 received in the storage compartments 216 than the capacity thereof, issues with respect to the cartridges moving in the storage compartments and/or rattling may be substantially avoided.

Thereby, spare cartridges 104 may be received in the storage compartments 216 for later use, refilling, or disposal. In this regard, the accessory 200 may not only be configured to charge the aerosol delivery device 100, but additionally or alternatively configured to store the aerosol delivery device in a manner convenient for transport by a user. As described above, the connector 208 may be configured to engage the control body 102 and the storage compartment(s) 216 may be configured to store cartridges 104, such that each component of the aerosol delivery device 100 is securely retained in the cavity 204. Further, the accessory 200 may include additional features configured to facilitate usage of the aerosol delivery device 100.

In this regard, as noted above, the accessory 200 may be configured to store cartridges 104 in the drawer assembly 210. However, it may be useful to store a cartridge 104 in an additional or alternative location in some embodiments. For example, it may be desirable to store a cartridge 104 in a location separate from the storage compartments 216 in the drawer assembly 210 in order to assist a user in remembering which cartridge has been partially used. Thereby, a user may be able to quickly access the partially used cartridge 104 without having to sort through the cartridges received in the storage compartments 216 in the drawer assembly.

Accordingly, as illustrated in FIG. 5, in some embodiments the accessory 200 may additionally include a slider 220. The slider 220 may include a coupler 222 configured to engage a cartridge 104 of the aerosol delivery device 100. The slider 220 may be configured to move the cartridge 104 from a recessed position in which the cartridge is received in the cavity 204 (see, FIG. 3) defined by the housing 202 to an extended position in which the cartridge at least partially extends out of the housing. In this regard, FIG. 2 illustrates the slider 220 and the cartridge 104 in the recessed position, whereas FIG. 5 illustrates the slider and the cartridge in the extended position.

The slider 220 may be positioned adjacent to the drawer assembly 220 in the cavity 204 (see, FIG. 4). However, the slider 202 may be decoupled from the drawer assembly 220. Thereby, the slider 220 may be independently moveable relative to the drawer assembly 210 and the housing 202. In other words, the slider 220 may be moved between the extended position and the retracted position regardless of the position of the drawer assembly 210 and without requiring movement of the drawer assembly. Conversely, the drawer 210 may be moved between the extended configuration and the retracted configuration regardless of the position of the slider 220 and without requiring movement of the slider. Thus, the cartridge 104 engaged by the slider 220 may be accessed by a user without requiring opening of the drawer assembly 210, and the control body 102 and the cartridges received in the storage compartments 216 may be accessed without requiring movement of the slider 220.

As illustrated in FIG. 5, the slider 220 may include an actuator 224. Further, the housing 202 may define a slot 226. The actuator 224 may be received in the slot 226. Thereby, the slot 226 may guide movement of the slider 220 between the extended position and the retracted position. In order to facilitate movement of the slider 220, in some embodiments the slider may extend out of the housing 202 through the slot 226. In particular, the actuator 224 may extend out of the housing 202 through the slot 226 past the outer surface defined by the housing 202. Thereby, the actuator 224 may be more easily engaged and moved by a user. For example, the actuator 224 may be engaged and moved by a user's thumb when the accessory 200 is received in the user's hand.

In some embodiments the slider 220 may be configured to engage the cartridge 104 without forming an electrical connection therewith. In this regard, the slider 220 may be employed to store the cartridge in the cavity 204 (see, FIG. 3) and retrieve the cartridge therefrom. However, in other embodiments the slider 220 may be configured to perform additional functions. For example, the slider 220 may electrically couple to the cartridge 104. In this regard, the coupler 222 of the slider 220 may be substantially similar to the coupler 108 of the control body 100. Thereby, for example, the coupler 222 may include electrical contacts configured to engage heating terminals of the cartridge 104.

By electrically coupling to the cartridge 104, the accessory 200 may perform a variety of functions. For example, the accessory 200 may direct current to the cartridge 104 when a user draws thereon to produce aerosol. In this regard, in some embodiments the slider 220 or another portion of the accessory 100 may include components substantially equivalent to the control body 102 (see, FIG. 3). Alternatively, the accessory 200 may include a switch that, when actuated and when the slider 220 is in the extended position, directs current to the cartridge 104 to produce aerosol. In either embodiment, the current directed to the cartridge 104 may be provided by the electrical power source 206 (see, e.g., FIG. 8).

As described above, the slider 220 may be configured to engage at least a portion of the aerosol delivery device 100. As further described above, in some embodiments the slider 220 may be configured to engage the cartridge 104. However, in other embodiments the slider 220 may be configured to engage the control body 102. Further, in an additional embodiment the slider 220 may be configured to engage the aerosol delivery device 100 as an assembled product. In this regard, the slider 220 may be configured to move the control body 102 and/or the cartridge 104 to the recessed position inside the cavity 204 defined by the housing 202.

In some embodiments, as illustrated in FIG. 4, the accessory 200 may include a power meter 228. The power meter 228 may be configured to display a power level of one or both of the electrical power source 206 (see, e.g., FIG. 8) of the accessory 200 and the aerosol delivery device 100 (e.g., the power level of the electrical power source 106 of the control body 102). In some embodiments the power meter 228 may include a plurality of indicators 230 (e.g., light emitting diodes). Thereby, for example, the number of the indicators 230 that illuminate may correspond to the power level of one or both of the electrical power source 206 (see, e.g., FIG. 8) of the accessory 200 and the aerosol delivery device 100. Additionally or alternatively, the color of the indicators 230 may change to reflect the power level of one or both of the electrical power source 206 (see, e.g., FIG. 8) of the accessory and the aerosol delivery device 100.

As further illustrated in FIG. 4, the accessory 200 may include a power button 232. The power button 232 may be actuated in order to start or stop charging of the aerosol delivery device 100. Additionally, the accessory may include a charging port 234. Various embodiments of the charging port 234 may be employed, such as a universal serial bus (USB) connector or any variation thereof. However, it should be understood that any embodiment of an electrical connector may be employed as the charging port 234. In this regard, the charging port 234 may be configured to receive current from an external electrical power source in order to charge the electrical power source 206 (see, e.g., FIG. 8) of the accessory 200.

The accessory 200 is generally described herein as being employed to charge an aerosol delivery device 100 received in the cavity (see, FIG. 3). In this regard, the charging port 234 may be employed to charge the accessory 200. However, in some embodiments the charging port 234 may be additionally or alternatively configured to direct current out of the accessory 200 to an external device. Thus, for example, the accessory 200 may be employed to charge a smart phone, a laptop, or other portable electronic device.

As may be understood, the particular construction of the accessory 200 may vary. However, by way of example, FIG. 6 illustrates a partially-exploded view of the accessory 200. As illustrated, the housing 202 may comprise a first housing portion 236 and a second housing portion 238. The first housing portion 236 may include one or more pads 240. The pads 240 may be configured to align with the one or more storage compartments 216 when the drawer assembly 210 is in the retracted configuration. Thereby, when one or more cartridges 104 (see, e.g., FIG. 3) are received in the one or more storage compartments 216, the pads 240 may contact the cartridges to restrain movement of the cartridges. For example, the pads 240 may comprise an elastomeric material such as rubber, which may dampen movement of the cartridges 104 and thereby reduce rattling or other noise associated with movement of the cartridges. Note that the embodiment of the storage compartment 216' illustrated in FIG. 5 does not include the spacer 218 (see, FIG. 3). In this regard, the pads 240 may contact the cartridge(s) 104 (see, e.g., FIG. 5) so as to limit the movement thereof.

As further illustrated in FIG. 6, the housing 202 may include a divider wall 242. In particular, the second housing portion 238 may include the divider wall 242. The divider wall 242 may divide the cavity 204 into a drawer portion 244 and a slider portion 246. The drawer portion 244 of the cavity 204 may be configured to receive the drawer assembly 210. The slider portion 246 of the cavity 204 may be configured to receive the slider 220. In this regard, the divider wall 242 and other portions of the housing 202 may guide movement of the drawer assembly 210 and the slider 220 within the cavity 204.

As noted above, the housing 202 may define the slot 226 through which the slider 220 extends. In some embodiments the slot 226 may be defined by the first housing portion 236 and the second housing portion 238. Further, as illustrated in FIG. 6, in one embodiment the slot 226' may be enclosed, whereas in another embodiment (see, FIGS. 2 and 5), the slot 226 may be open at one end. However, it should be understood that in either embodiment removal of the slider 220 from the housing 202 may be prevented by contact between the slider and the housing.

Further, in some embodiments the accessory 200 may include features configured to releasably retain the slider 220 in one or both of the extended position and the recessed position. For example, as illustrated in FIG. 6, the housing 202 may include a protrusion 248. For example, the protrusion 248 may comprise a flap extending inwardly into the cavity 204 from the first housing portion 236. The protrusion 248 may be configured to engage one or more recesses defined in the slider 220. For example, the slider 220 may include a first recess 250a and a second recess 250b. The protrusion 248 may be configured to engage the first recess 250a when the slider is in the recessed position. Conversely, the protrusion 248 may be configured to engage the second recess 250b when the slider 220 is in the extended position. Engagement between the protrusion 248 and one of the first recess 250a and the second recess 250b may releasably retain the slider 220 in a selected position. Accordingly, the engagement between the protrusion 248 and the first recess 250a may releasably retain the slider 220 in the recessed position, whereas engagement between the protrusion and the second recess 250b may releasably retain the slider in the extended configuration. Thereby, the slider 220 may be retained in a desired position to facilitate storage of a cartridge 104 (see, e.g., FIG. 5) and access thereto when desired.

As noted above, the power meter 228 may be configured to display a power level of one or both of the electrical power source 206 (see, e.g., FIG. 8) of the accessory 200 and the aerosol delivery device 100. As illustrated in FIG. 6, in one embodiment the power meter 228' may include a first set of indicators 230a and a second set of indicators 230b. Thereby, by way of example, the first set of indicators 230a may display a power level of the electrical power source 206 (see, e.g., FIG. 8) of the accessory 200, whereas the second set of indicators 230b may display the power level of the aerosol delivery device 100. Further, in some embodiments the first and second sets of indicators 230a, 230b may be configured to simultaneously display the power levels.

The first housing portion 236 may be engaged with the second housing portion 238 during assembly of the accessory 200. In this regard, the drawer assembly 210 and the slider 220 may be positioned between the first housing portion 236 and the second housing portion 238. Fasteners 252 such as screws may retain the first housing portion 236 in engagement with the second housing portion 238.

After the first housing portion 236 is engaged with the second housing portion 238, the accessory 200 may define the configuration illustrated in FIG. 7. As further illustrated in FIG. 7, in some embodiments the housing 202 may further comprise an outer jacket 253. In some embodiments the outer jacket 253 may comprise a metal material, which may provide a pleasing appearance, whereas most or all of a remainder of the housing 202 and the drawer assembly 210 may comprise plastic. However, as may be understood, various other materials may be employed in other embodiments.

The outer jacket 253 may extend over the first housing portion 236 and the second housing portion 238. The outer jacket 253 may define first and second open ends 253A, 253B, such that the outer jacket may slide over the first housing portion 236 and the second housing portion 238. Thereby, the outer jacket 253 may engage recessed outer surfaces 254 defined at the first housing portion 236 and the second housing portion 238 such that the outer jacket may engage the first housing portion and the second housing portion and remain in engagement therewith via interference fit. Further, the outer jacket 253 may define a side opening 255 that extends along at least a portion of the longitudinal length thereof. Thereby, the outer jacket 253 may not impede movement of the slider 220. In this regard, the side opening 255 may overlap with the slot 226' defined by the first housing portion 236 and the second housing portion 238.

Further, in some embodiments the outer jacket 253 may be adhered to the first housing portion 236 and the second housing portion 238. For example, double-sided tape 256 may be positioned between the outer jacket 253 and the first housing portion 236. Further, double-sided tape 256 may be positioned between the outer jacket 253 and the second housing portion 238.

As may be understood, the construction of the drawer assembly 210 may vary. However, by way of example, FIG. 8 illustrates an exploded view of the drawer assembly 210. As illustrated, the drawer assembly 210 may include a drawer base 258. The drawer base 258 may be configured to couple to the outer end wall 212. Fasteners 260 (e.g., screws) may retain the outer end wall 212 in engagement with the drawer base 258. Further, the drawer base 258 may be configured to receive the electrical power source 206. In this regard, the drawer base 258 may define an electrical power source cavity 262 configured to receive the electrical power source 206.

The drawer base 258 may additionally include a connector cavity 264 configured to receive the connector 208. A collar 266 may engage both the connector 208 and the connector cavity 264 to retain the connector in a desired position within the connector cavity.

Further, the drawer assembly 210 may include a control circuit 268. The control circuit 268 may extend along a lateral edge of the drawer base 258. In order to receive and retain the control circuit 268 in place, the drawer base 258 may additionally include one or more clips 270.

The control circuit 268 may be configured to control charging of the aerosol delivery device 100 (see, e.g., FIG. 3). In this regard, the control circuit 268 may include a controller configured to execute control logic that employs the electrical power source 206 to charge the aerosol delivery device 100 (see, FIG. 3). In this regard, by way of example, the control logic may be configured to stop directing current to the aerosol delivery device 100 when the aerosol delivery device reaches a desired power level (e.g., a full charge). Further, the control circuit 268 may include control logic configured to control charging of the electrical power source 206. In this regard, the control logic may be configured to stop directing current to the electrical power source 206 from an external electrical power source when the electrical power source 206 reaches a desired power level (e.g., a full charge).

FIG. 9 illustrates the electrical power source 206, the control circuit 268, and the connector 208 engaged with the drawer base 258. Further, FIG. 9 illustrates the power meter 228', an inner end wall 272, and a drawer cover 274 in an exploded configuration relative to the drawer base 258. The drawer cover 274, which may define the storage compartment 216', may couple to the top of the drawer base 258. The connector 208 may be recessed within the drawer assembly 210 when the drawer cover 274 is engaged with the drawer base 258. In this regard, contact between the connector 208 and the drawer cover 274 and the drawer base 258 may restrain movement of the connector during engagement and disengagement of the control body 102 (see, FIG. 3). Further, the inner end wall 272 may slide over the drawer cover 274 and the drawer base 258 to engage the outer end wall 212. Fasteners 278 (e.g., screws) may retain the drawer cover 274 in engagement with the drawer base 258 and/or retain the inner end wall 272 in engagement with the outer end wall 212.

The power meter 228' may include a cable 280 (e.g., a ribbon cable) configured to engage a control circuit connector 282 included in the control circuit 268. The cable 280 may be inserted through the outer end wall 212 into engagement with the control circuit connector 282. In this regard, in order to facilitate assembly of the drawer assembly 210, the cable 280 may be engaged with the control circuit connector 282 prior to engaging the drawer cover 274 with the drawer base 258 and prior to engaging the inner end wall 272 with the outer end wall 212.

Accordingly, the drawer assembly 210 may comprise the components described above and assembled to define the configuration illustrated in FIG. 10. Thereby, the drawer assembly 210 may be inserted into the housing 202 or the housing may be assembled around the drawer assembly 210 as described above.

In an additional embodiment a method for assembling an aerosol delivery device accessory is provided. As illustrated in FIG. 11, the method may include electrically coupling an electrical power source and a connector at operation 302. The connector being configured to engage an aerosol delivery device to charge the aerosol delivery device. Further, the method may include engaging the connector and the electrical power source with a drawer assembly at operation 304. The method may additionally include inserting the drawer assembly into a housing at operation 306. The drawer assembly may be movable with respect to the housing from an extended configuration in which the connector is accessible to a retracted configuration in which the housing is substantially enclosed.

In some embodiments the method may further comprise assembling the drawer assembly. Assembling the drawer assembly may include engaging a drawer cover with a drawer base. The method may additionally include electrically coupling a power meter with at least one of the electrical power source and the connector. The power meter may be configured to display a power level of one or both of the electrical power source and the aerosol delivery device.

Further, the method may include positioning a slider in the housing. The slider may be configured to engage at least a portion of the aerosol delivery device. Further, the slider may be configured to move the portion of the aerosol delivery device from a recessed position in which the portion of the aerosol delivery device is received in the housing to an extended position in which the portion of the aerosol delivery device at least partially extends out of the housing. Positioning the slider in the housing may include positioning the slider adjacent to the drawer assembly.

In some embodiments inserting the drawer assembly into the housing at operation 306 may include positioning the drawer assembly between a first housing portion and a second housing portion and engaging the first housing portion with the second housing portion. The method may additionally include positioning a coupler in the housing. The coupler may be configured to engage a cartridge of the aerosol delivery device. Positioning the coupler in the housing may include positioning a slider in the housing. The slider may be engaged with the coupler and configured to move the cartridge from a recessed position in which the cartridge is received in the housing to an extended position in which the cartridge at least partially extends out of the housing.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An aerosol delivery device accessory, comprising:
a housing defining a cavity substantially enclosed at a first end and open at an opposing second end, the housing defining a longitudinal axis extending between the first end and the opposing second end;
a drawer assembly comprising an end wall, the drawer assembly being configured to be inserted in the cavity of the housing along the longitudinal axis of the housing such that the end wall of the drawer assembly is disposed proximate the opposing second end of the housing;
an electrical power source engaged with the drawer assembly;
a connector engaged with the drawer assembly, the connector being electrically coupled to the electrical power source and configured to engage a first aerosol delivery device to charge the first aerosol delivery device;
a divider wall extending between the first end and the opposing second end of the housing to divide the housing into a first portion configured to receive the drawer assembly and a second portion defining a recess; and
a slider configured to engage at least a portion of a second aerosol delivery device, the slider being positioned adjacent to the recess of the second portion of the housing, the slider being configured to move the portion of the second aerosol delivery device from a recessed position in which the portion of the second aerosol delivery device is received in the second portion of the housing to an extended position in which the portion of the second aerosol delivery device at least partially extends out of the second portion of the housing through an opening defined through the first end of the housing, the opening being aligned with an axis of the recess of the second portion, the first aerosol delivery device and the second aerosol delivery device being the same or different;
the drawer assembly being movable with respect to the housing independently of the slider from an extended configuration in which the connector is accessible to a retracted configuration in which the end wall of the drawer assembly substantially covers the opposing second end of the housing such that the housing is substantially enclosed at both the first end and the opposing second end.

2. The aerosol delivery device accessory of claim 1, wherein the drawer assembly defines a storage compartment configured to receive a cartridge.

3. The aerosol delivery device accessory of claim 1, wherein the slider is configured to engage a cartridge of the second aerosol delivery device.

4. The aerosol delivery device accessory of claim 1, wherein the connector is configured to engage a control body of the first aerosol delivery device.

5. The aerosol delivery device accessory of claim 4, further comprising a coupler configured to engage a cartridge of the second aerosol delivery device.

6. The aerosol delivery device accessory of claim 5, wherein the coupler is engaged with a slider configured to move the cartridge from a recessed position in which the cartridge is received in the housing to an extended position in which the cartridge at least partially extends out of the housing.

7. The aerosol delivery device of claim 6, wherein the slider extends out of the housing.

8. The aerosol delivery device accessory of claim 1, further comprising a power meter configured to display a power level of one or both of the electrical power source and the first aerosol delivery device.

9. The aerosol delivery device accessory of claim 1, further comprising a control circuit configured to control charging of the first aerosol delivery device.

10. A method for assembling an aerosol delivery device accessory, comprising:
- electrically coupling an electrical power source and a connector, the connector being configured to engage a first aerosol delivery device to charge the first aerosol delivery device;
- engaging the connector and the electrical power source with a drawer assembly comprising an end wall;
- inserting the drawer assembly into a cavity of a housing, the cavity of the housing being substantially enclosed at a first end and open at an opposing second end, the housing defining a longitudinal axis extending between the first end and the opposing second end, the drawer assembly being configured to be inserted in the cavity of the housing along the longitudinal axis thereof such that the end wall of the drawer assembly is disposed proximate the opposing second end of the housing;
- inserting a divider wall in the housing to divide the housing into a first portion configured to receive the drawer assembly and a second portion defining a recess, the divider wall extending between the first end and the opposing second end of the housing; and
- positioning a slider adjacent to the recess of the second portion of the housing, the slider being configured to engage at least a portion of a second aerosol delivery device, the slider being configured to move the portion of the second aerosol delivery device from a recessed position in which the portion of the second aerosol delivery device is received in the second portion of the housing to an extended position in which the portion of the second aerosol delivery device at least partially extends out of the second portion of the housing through an opening defined through the first end of the housing, the opening being aligned with an axis of the recess of the second portion; the first aerosol delivery device and the second aerosol delivery device being the same or different, the drawer assembly being movable with respect to the housing independently of the slider from an extended configuration in which the connector is accessible to a retracted configuration in which end wall of the drawer assembly substantially covers the opposing second end of the housing such that the housing is substantially enclosed at both the first end and the opposing second end.

11. The method of claim 10, further comprising assembling the drawer assembly, wherein assembling the drawer assembly comprises engaging a drawer cover with a drawer base.

12. The method of claim 10, further comprising electrically coupling a power meter with at least one of the electrical power source and the connector, the power meter being configured to display a power level of one or both of the electrical power source and the first aerosol delivery device.

13. The method of claim 10 wherein inserting the drawer assembly into the housing comprises positioning the drawer assembly between a first housing portion and a second housing portion and engaging the first housing portion with the second housing portion.

14. The method of claim 10, further comprising positioning a coupler in the housing, the coupler being configured to engage a cartridge of the second aerosol delivery device.

15. The method of claim 14, wherein positioning the coupler in the housing comprises positioning a slider in the housing, the slider being engaged with the coupler and configured to move the cartridge from a recessed position in which the cartridge is received in the housing to an extended position in which the cartridge at least partially extends out of the housing.

* * * * *